United States Patent
Toosizadeh et al.

(10) Patent No.: US 9,990,024 B2
(45) Date of Patent: Jun. 5, 2018

(54) CIRCUITS AND METHODS PROVIDING VOLTAGE ADJUSTMENT AS PROCESSOR CORES BECOME ACTIVE BASED ON AN OBSERVED NUMBER OF RING OSCILLATOR CLOCK TICKS

(71) Applicant: QUALCOMM Incorporated, San Diego, CA (US)

(72) Inventors: Navid Toosizadeh, San Diego, CA (US); Mohammad Reza Kakoee, San Diego, CA (US); Shih-Hsin Jason Hu, San Diego, CA (US); Mohamed Waleed Allam, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/849,343

(22) Filed: Sep. 9, 2015

(65) Prior Publication Data

US 2017/0068309 A1    Mar. 9, 2017

(51) Int. Cl.
*G06F 1/32* (2006.01)

(52) U.S. Cl.
CPC ............ *G06F 1/3296* (2013.01); *G06F 1/324* (2013.01); *G06F 1/3206* (2013.01); *Y02D 10/126* (2018.01); *Y02D 10/172* (2018.01)

(58) Field of Classification Search
CPC .................................................... G06F 1/3203
USPC ......................................................... 713/300
See application file for complete search history.

(56) References Cited

U.S. PATENT DOCUMENTS

| | | | |
|---|---|---|---|
| 7,418,368 B2* | 8/2008 | Kim .................... | G01R 31/3004 702/185 |
| 7,502,948 B2* | 3/2009 | Rotem ................... | G06F 1/206 713/300 |
| 7,636,864 B2* | 12/2009 | Burton ...................... | G06F 1/26 323/234 |
| 8,245,070 B2* | 8/2012 | Finkelstein ........... | G06F 1/3203 713/322 |
| 8,347,129 B2 | 1/2013 | Paik | |
| 8,402,294 B2* | 3/2013 | Burton ..................... | G06F 1/26 323/234 |

(Continued)

FOREIGN PATENT DOCUMENTS

WO    WO-2011003083 A1    1/2011

OTHER PUBLICATIONS

Partial International Search Report—PCT/US2016/048447—ISA/EPO—dated Nov. 11, 2016.

(Continued)

*Primary Examiner* — Suresh Suryawanshi
(74) *Attorney, Agent, or Firm* — Haynes and Boone, LLP (57) ABSTRACT

A method including receiving an indication of a number of active processing units in a computer processor; in response to receiving the indication, determining an appropriate operating voltage margin for the computer processor; reducing an operating frequency of the active processing units in response to receiving the indication; adjusting a power supply to increase or decrease a voltage to the computer processor in accordance with the appropriate operating voltage margin; and increasing the operating frequency of the active processing units in response to an acknowledgment that the power supply has been adjusted.

27 Claims, 5 Drawing Sheets

(56) References Cited

U.S. PATENT DOCUMENTS

| | | | |
|---|---|---|---|
| 8,527,795 B2* | 9/2013 | Howard | G06F 1/30 |
| | | | 713/320 |
| 8,565,806 B2* | 10/2013 | Burdenski | H03G 3/3042 |
| | | | 370/318 |
| 8,594,981 B2* | 11/2013 | Ivchenko | G01C 25/005 |
| | | | 318/648 |
| 8,612,781 B2 | 12/2013 | Naffziger et al. | |
| 8,943,340 B2* | 1/2015 | Ananthakrishnan | G06F 1/26 |
| | | | 713/320 |
| 8,949,635 B2* | 2/2015 | Gunther | G06F 9/30181 |
| | | | 713/300 |
| 9,304,573 B2* | 4/2016 | Lee | G06F 1/3296 |
| 9,335,803 B2* | 5/2016 | Wang | G06F 1/26 |
| 9,367,114 B2* | 6/2016 | Wells | G06F 1/3206 |
| 9,568,982 B1* | 2/2017 | Allen-Ware | G06F 1/3243 |
| 9,600,059 B2* | 3/2017 | Sotomayor | G06F 1/324 |
| 2005/0046400 A1* | 3/2005 | Rotem | G06F 1/3203 |
| | | | 323/234 |
| 2006/0053326 A1* | 3/2006 | Naveh | G06F 1/3203 |
| | | | 713/323 |
| 2006/0149975 A1* | 7/2006 | Rotem | G06F 1/206 |
| | | | 713/300 |
| 2008/0136400 A1 | 6/2008 | Chi et al. | |
| 2009/0037712 A1 | 2/2009 | Mallik et al. | |
| 2009/0289615 A1 | 11/2009 | Foley | |
| 2012/0066535 A1* | 3/2012 | Naffziger | G06F 1/206 |
| | | | 713/340 |
| 2012/0072746 A1* | 3/2012 | Sotomayor | G06F 1/324 |
| | | | 713/320 |
| 2014/0070878 A1 | 3/2014 | Kawasaki | |
| 2014/0101420 A1 | 4/2014 | Wu | |
| 2014/0181537 A1 | 6/2014 | Manne et al. | |
| 2014/0237267 A1 | 8/2014 | Wang et al. | |
| 2014/0281594 A1 | 9/2014 | Yang et al. | |
| 2014/0380071 A1 | 12/2014 | Lee et al. | |
| 2015/0198988 A1* | 7/2015 | Dasnurkar | G06F 1/324 |
| | | | 702/64 |
| 2016/0004289 A1* | 1/2016 | Chung | G06F 1/324 |
| | | | 713/322 |

OTHER PUBLICATIONS

International Search Report and Written Opinion—PCT/US2016/048447—ISA/EPO—dated Mar. 10, 2017.

* cited by examiner

CIRCUITS AND METHODS PROVIDING VOLTAGE ADJUSTMENT AS PROCESSOR CORES BECOME ACTIVE BASED ON AN OBSERVED NUMBER OF RING OSCILLATOR CLOCK TICKS

TECHNICAL FIELD

This application relates to multi-core processors and, more specifically, to providing voltage adjustment as cores become active and become inactive.

BACKGROUND

Conventional processors may include multiple cores. For instance, a central processing unit (CPU) may include multiple ARM™ processing cores, where as a graphics processing unit (GPU) may include multiple shader cores. During operation of a multi-core processor, some cores may be active, whereas other cores may be inactive. Examples of a core being inactive include a core being clock-gated or power-collapsed or otherwise in an idle state. As load increases, the processor may increase the number of active cores, and as load decreases the processor may make some of the cores inactive.

Some processing jobs may be periodic in that they tend to use a relatively large amount of power at regular time intervals. Examples include graphics processing jobs handling a sequence of frames. When a large number of cores are active, it is a possibility that periodic processing by different cores may overlap, using a large amount of power and thereby causing voltage droops. The chance of voltage droops increases with an increasing number of active cores. Some voltage droops are harmless, though it may be undesirable for voltage to droop below a certain minimum level.

Furthermore, it is generally expected that voltage droop associated with a large number of cores may be larger than voltage droop associated with a small number of cores. Or put another way, as the number of active cores increases, possible voltage droops scenarios include potentially larger droops. Thus, conventional systems may build in a voltage margin so that the voltage is high enough during operation that expected droops will not lower the voltage below the baseline needed for the device to work. Also, such conventional systems would typically use a built-in voltage margin to withstand a worst-case scenario. Thus, in a processor having four cores, the conventional system would build a margin to accommodate four cores, and the processor would operate at that margin regardless of the number of cores that are active or inactive. However, this can be wasteful, as higher operating voltages may be expected to increase leakage current in the transistors of the processor. There is, therefore, a desire in the art for better techniques to provide adequate voltage margin.

SUMMARY

Various embodiments include systems and methods that adjust a voltage margin of a computer processor in response to a chance in a number of active or inactive cores. An example method includes receiving an indication of a number of active processing units in a computer processor, in response to receiving the indication determining an appropriate operating voltage margin for the computer processor, reducing an operating frequency of the active processing units in response to receiving the indication, adjusting a power supply to increase or decrease a voltage to the computer processor in accordance with the appropriate operating voltage margin, and increasing the operating frequency of the active processing units in response to an acknowledgment that the power supply has been adjusted.

An example system includes a computer processor having a plurality of processing cores, a temperature sensor configured to detect an operating temperature of the computer processor, and a power supply configured to deliver an adjustable voltage to the computer processor. The system further includes a first processing logic that is configured to receive information from the temperature detector indicative of the operating temperature of the computer processor and to receive information indicative of the number of active processing cores, the first processing logic further configured to control the power supply to provide an operating voltage margin corresponding to the operating temperature of the computer processor and the information indicative of the number of active processing cores. The system also has a second processing logic that is configured to adjust an operating frequency of the computer processor down in response to a change in the number of active processing cores and further configured to adjust the operating frequency of the computer processor up after the first processing unit causes an adjustment of the voltage margin.

Another example method includes determining to change a status of a first processing core from inactive to active in a computer processor having a plurality of processing cores, in response to determining to change the status, selecting an appropriate voltage margin for the computer processor corresponding to an increased number of active ones of the processing cores, in response to determining to change the status, and before making the first core active, decreasing a frequency of operation of the computer processor, making the first core active and applying the selected appropriate voltage margin, and increasing the frequency of operation of the computer processor after applying the selected appropriate voltage margin.

DETAILED DESCRIPTION

Various embodiments provided herein include systems and methods to adjust an operating voltage margin based upon a number of cores that are currently active. Such embodiments may provide the advantage of being able to operate at a lower voltage margin when a fewer number of cores are operating, thereby reducing power consumption and waste. As the number of active cores increases, the system may increase the voltage margin, and as the number of active cores decreases, the system may decrease the voltage margin.

In one embodiment, the computer processor implements a process to select an appropriate voltage margin or operating voltage as the number of active cores changes. Selecting the voltage margin or operating voltage may include traversing a table of values, where each entry in the table of values corresponds to a respective number of active cores, operating temperature, and voltage data. Thus, some embodiments include temperature as a factor in selecting an operating voltage or voltage margin.

Further, various embodiments may include frequency adjustment techniques to facilitate making cores active. Frequency adjustment may include increasing or decreasing a clock speed, as explained in more detail below. For instance, after the processor has determined to change the number of active cores (e.g., to make one or more additional cores active) the processor may reduce its frequency of operation by some amount. The amount of frequency adjustment may, for instance, reduce the operating frequency to an amount expected to be a safe operating frequency as a worst-case scenario in light of operating voltage and number of cores. Then, the processor makes the additional cores active after the frequency has been adjusted. Once the cores are active and the voltage margin has been changed, the processor returns itself to its normal operating frequency by increasing the operating frequency. An advantage of such embodiments is that the additional cores may be made active before the voltage has been adjusted.

Some embodiments may also implement the voltage margin adjustment described above as an open-loop hardware process in order to provide relatively quick response time. Therefore, as active cores are added or made inactive, the system may adjust the voltage margin within a few clock cycles, and generally faster than would be expected of a similar software-based process. However, the scope of embodiments does not exclude implementing the process in either hardware or software or a combination thereof.

The process described above, which adjusts a voltage margin in response to a change in a number of active cores, may be implemented in addition to other processes that adjust a voltage of the processor. An example is adaptive voltage scaling (AVS), which may include a closed-loop process to continually monitor and adjust a voltage of the processor in response to temperature changes to facilitate proper operation at critical paths. For instance, some embodiments include both an open-loop process to adjust voltage margin in response to a change in number of active cores as well as a closed-loop AVS process. In such an example, the open-loop process adjusts the voltage margin relatively quickly, and once the system is settled so that the appropriate cores are active and frequency is returned to a normal operating frequency, control of the operating voltage returns to the AVS process.

Another process that may be implemented in addition to the per-core voltage margin adjustment process includes dynamic voltage and frequency scaling (DVFS). An example DVFS process may adjust a voltage and/or a frequency in response to a given workload. For instance, in a smart phone embodiment, a texting workload may be a lower demand process than a video watching workload. So the DVFS process of the smart phone may provide a lower voltage and/or frequency during a texting workload than during a video watching workload. Various embodiments described herein implement a DVFS process as well as a per-core margin adjustment process. Specifically, some embodiments may populate a table using the DVFS process, where the table entries include appropriate voltage adjustment values that may be selected by the per-core voltage margin adjustment process. The DVFS process may repopulate the table with each workload change.

Figure 1:
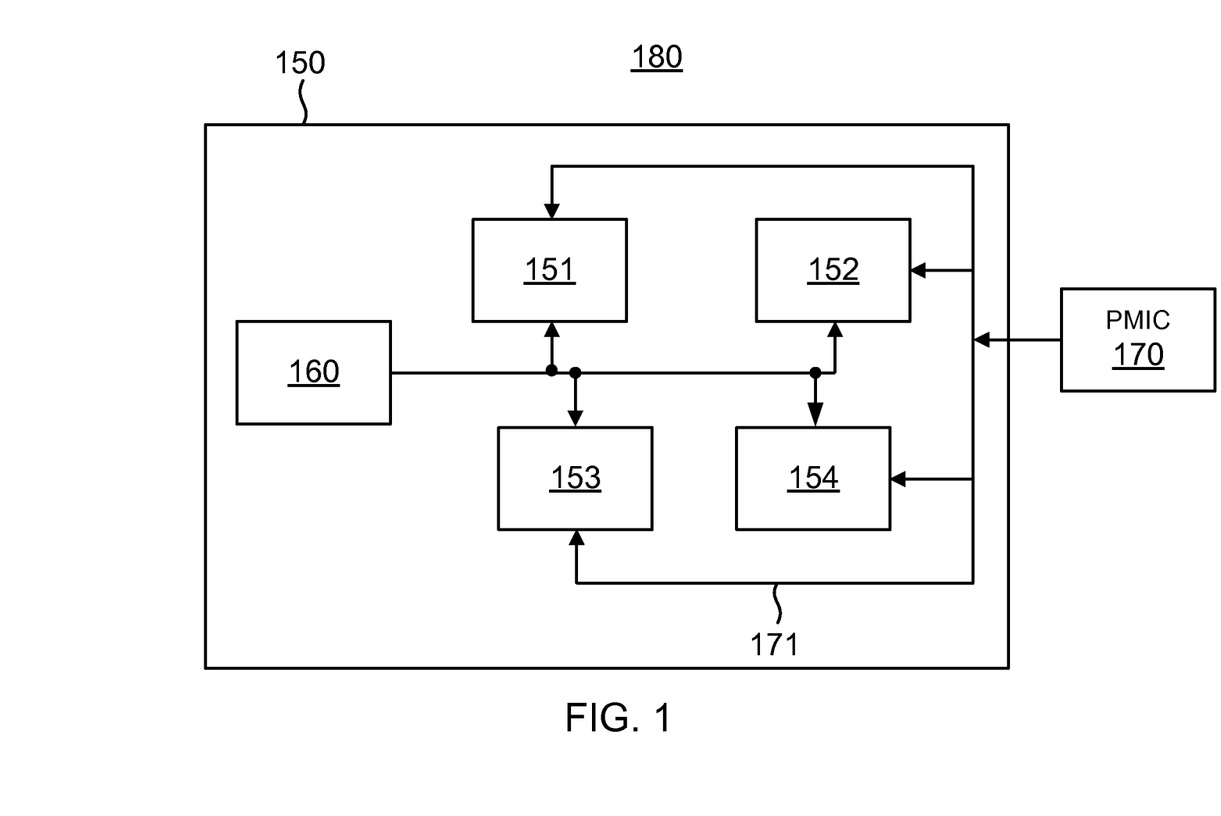
FIG. 1 is an architectural diagram illustrating an example system in which various embodiments may be implemented to adjust a voltage margin of a computer processor.

FIG. 1 is an architectural diagram illustrating an example system 180 in which various embodiments may be implemented. System 180 includes a central processing unit (CPU) 150 that has four processing cores, 151-154. Clocking circuit 160 provides a clock signal with an operating frequency to each of the cores 151-154. Power management integrated circuit (PMIC) 170 provides power to CPU 150, and specifically provides power to the cores 151-154 by power rail 171.

System 180 may be part of a system on chip (SOC) or other circuit arrangement, with PMIC 170 being physically separate from CPU 150. However, the scope of embodiments is not limited to any particular SOC architecture. In some embodiments, system 180 may be included in a computing device, such as a tablet computer, smartphone, or other appropriate device. In fact, the scope of embodiments includes any particular computing device, whether mobile or not. Embodiments including battery-powered devices, such as tablet computers and smart phones may benefit from the concepts disclosed herein. Specifically, the concepts described herein provide techniques to reduce a voltage margin when appropriate, which reduces power use of CPU 150, thereby conserving battery power and increasing consumer satisfaction.

FIG. 1 shows four cores 151-154 for ease of illustration, although the scope of embodiments includes any appropriate number of cores. For instance, other embodiments may include 16 cores, 32 cores, or other number. Also, while this example shows central processing unit 150, it is understood that the scope of embodiments applies to other kinds of processors, such as graphics processing units (GPUs) and the like. In examples including a CPU, cores 151-154 may be embodied as general-purpose processing cores, digital signal processing cores, modems, and the like. In examples including a GPU, cores 151-154 may be embodied as shader cores, texture mapping units, and the like.

Depending on processing demands and workload, various ones of the cores 151-154 may be active or inactive at a given time. For example, an active core receives a clock signal from clock circuit 160 and an operating voltage by power rail 171 and performs a processing function. An active core may be made inactive by gating the clock signal so that the particular core does not receive an oscillating clock signal. Additionally or alternatively, an active core may be made inactive by reducing its operating voltage or shutting off the voltage entirely to that core.

As explained in detail further below, CPU 150 includes systems and methods to adjust a voltage margin by interacting with PMIC 170 and to adjust a clock frequency by interacting with clocking circuit 160.

Figure 2:
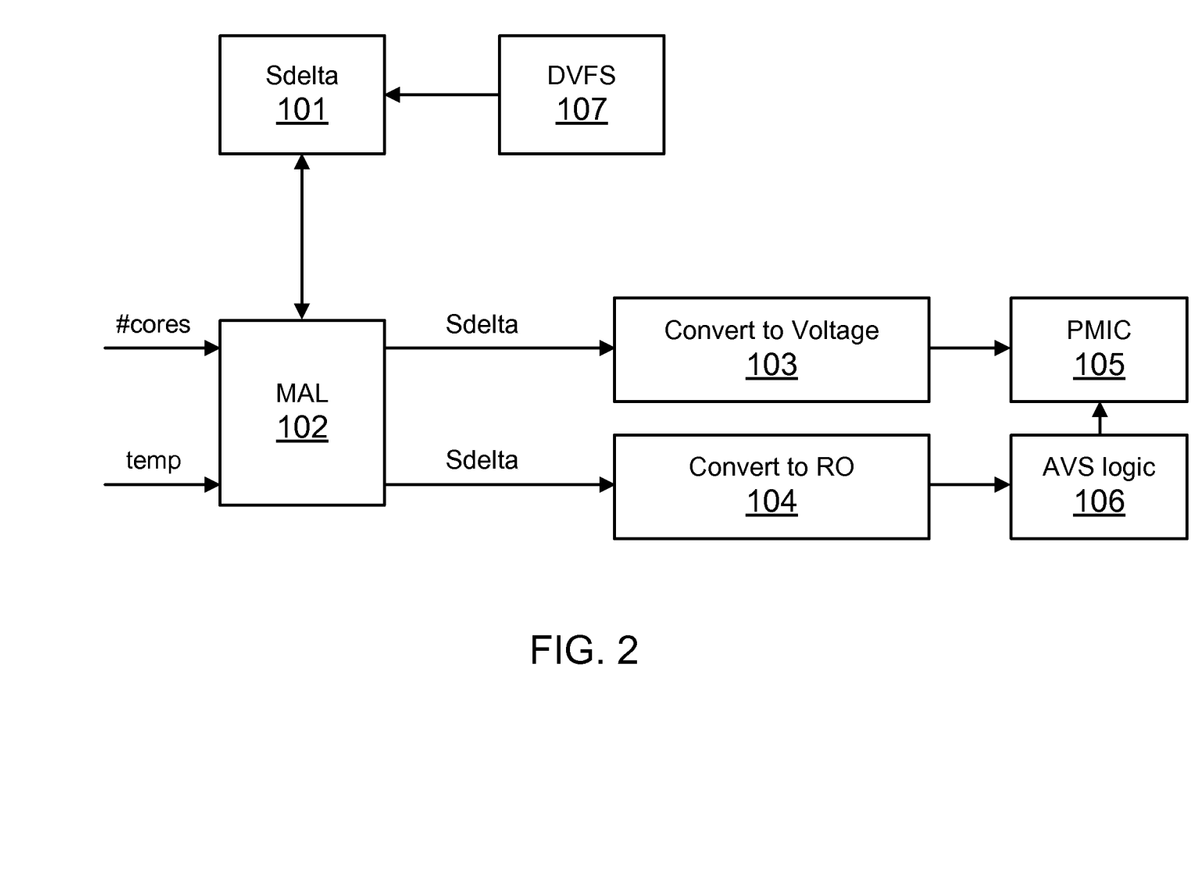
FIG. 2 provides an illustration of an example system to adjust a voltage margin of a computer processor, according to one embodiment.

FIG. 2 provides an illustration of an example system that performs the methods described herein. FIG. 2 is conceptual as well as physical, as some of the blocks in FIG. 2 represent processes that are performed by the circuits shown in FIG. 3. FIG. 2 includes a table 101 (Sdelta), which is populated by a DVFS process 107 that adjusts frequency of operation based on application processing use and workload. The table 101 includes a plurality of entries, each of the entries having a value that is associated with a particular number of active cores and an operating temperature. Each value is an indication of a voltage margin appropriate for that number of active cores and that temperature. Table 101 is described in more detail with respect to FIG. 4. DVFS process 107 affects operating voltage and/or frequency as it switches between modes according to workloads. Therefore, DVFS process 107 is also used in this embodiment to populate table 101 each time it switches a DVFS mode, so that the operating voltage margins provided by the table are consistent with a current DVFS mode.

Margin Adjustment Logic (MAL) block 102 receives a signal indicating a number of cores and a signal indicating temperature. When cores become active or inactive, thereby changing a number of active cores, MAL block 102 is made aware of the number of active cores, and it searches table 101 for an appropriate value for that number of cores and temperature. MAL block 102 then sends that table value to block 103, which converts a table value to a voltage value, which is then used to control a voltage that is output by power management integrated circuit (PMIC) 105. This is an open-loop method performed by a hardware process in this example, so that it provides quicker performance than a comparable software process, and it does not wait on the closed-loop AVS logic 106 before changing the voltage margin.

In this way, the system of FIG. 2 adjusts a voltage margin based on a number of active cores and an operating temperature. This may be a relatively quick change performed by an open-loop system in some embodiments. For instance, in a system in which the normal operating frequency is around 2 GHz, MAL block 102 may take around 10 µs to change the voltage margin. Of course, these numbers for operating frequency and time to perform the change are merely examples, as the concepts herein may be applied to any appropriate system using a different operating frequency.

In addition to the open-loop process that adjusts a voltage margin based on a number of cores, the system illustrated above further includes a closed-loop system that adjusts an operating voltage in accordance with a desired frequency of operation and a current operating temperature. Specifically, some operating frequencies may require at least a certain voltage in order to facilitate that operating frequency, and this relationship can change with temperature. It is desirable to maintain a sufficient operating voltage for a given operating frequency, and it is also desirable to lower a voltage when an operating frequency may sufficiently be achieved using a lower voltage. Accordingly, AVS logic block 106 implements a closed-loop process, which takes into account temperature and operating frequency to maintain a sufficient voltage. Although not shown herein, AVS logic block 106 measures frequency performance of the chip by measuring clock ticks in a ring oscillator. A smaller number of clock ticks indicates a slower frequency of operation and may result in the AVS logic block increasing a voltage. The increased voltage is generally expected to increase the frequency of operation of the ring oscillator. AVS logic block 106 measures the number of ticks in the ring oscillator and then raises or lowers voltage accordingly. AVS logic block 106 may also lower voltage when ring oscillator measurement indicates that frequency performance can be achieved with lower voltage. In some examples, this is performed by software code being executed at the CPU or GPU.

MAL block 102 operates in addition to AVS logic block 106, thereby affecting the voltage margin. The system of FIG. 2 includes input provided from MAL logic block 102 to AVS logic block 106 so that the two processes may work together. MAL block 102 sends the table value to process 104, which converts the table value to a ring oscillator number. For instance, if the table value indicates that voltage should be raised by 100 mV, the increase in millivolts may correspond to 50 clock ticks at the ring oscillator. This information is then passed to AVS logic block 106, which makes its voltage adjustments on top of the voltage margin from the MAL block 102.

An additional feature in some embodiments includes functionality, implemented in the processor, to adjust the frequency of operation as cores become active. For instance, if two active cores are operating at 2 GHz, when the processor determines to add another active core, it may lower the operating frequency to 1.9 GHz by adjusting a clock frequency of the processor. The processor then adds the third active core and, after an appropriate time, returns the operating frequency to 2 GHz. Dropping the frequency for a short amount of time may give the PMIC 105 time to complete the voltage adjustment before the active cores return to full processing capability.

Other embodiments may use a different operating frequency and may lower the operating frequency to another value different from 1.9 GHz. The amount at which the operating frequency is lowered may be based in part on a prior characterization of the processor and a known safe frequency at which correct operation may be obtained given that the PMIC 105 may supply a lower voltage before the margin is adjusted up. Such functionality is not illustrated in FIG. 2, but is described in more detail below with respect to FIG. 3.

In some examples, the processes performed by MAL logic block 102 as well as blocks 103, 104, and 106 are performed by a hardware process implemented on a chip, such as CPU 150 of FIG. 1. However, the scope of embodiments includes any of the processes being implemented in hardware, software or a combination thereof.

Figure 3:
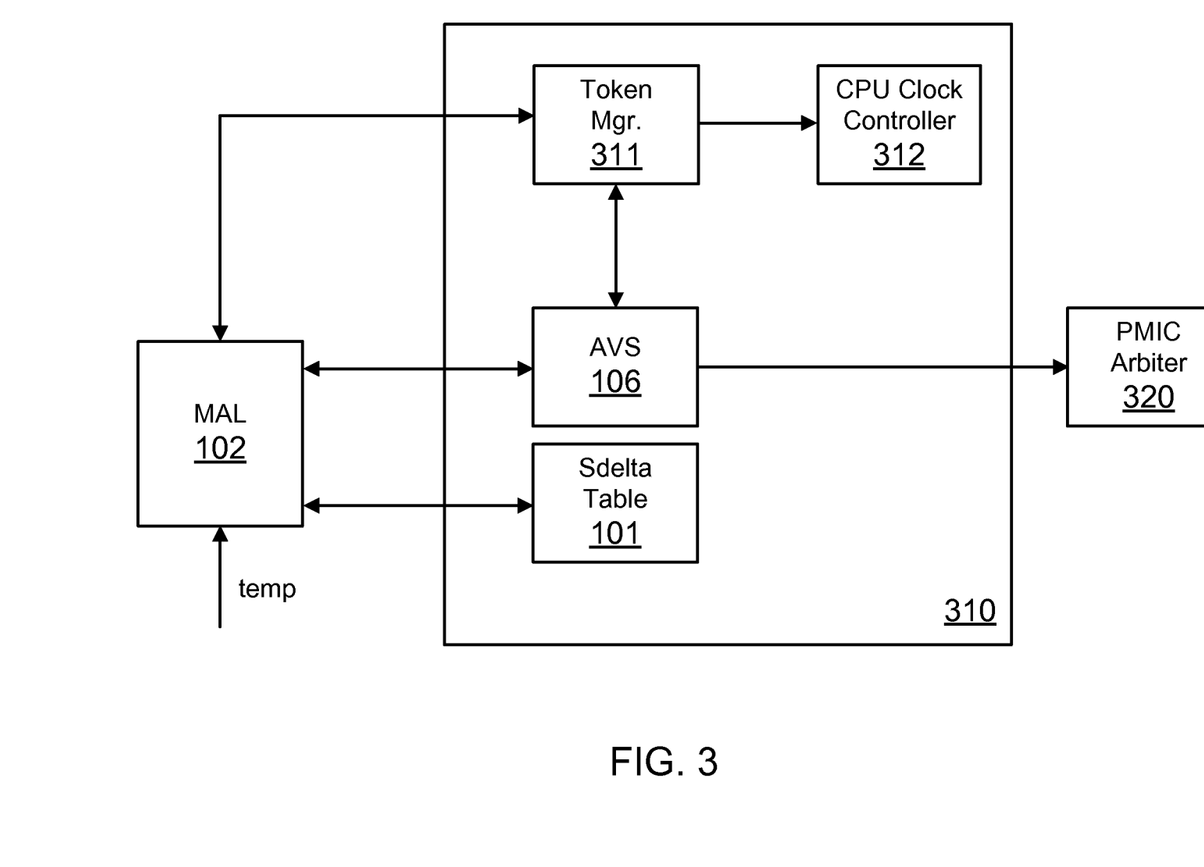
FIG. 3 is an example system for carrying out the actions described with respect to FIG. 2, according to one embodiment.

FIG. 3 is an example system for carrying out the actions described above with respect to FIG. 2. FIG. 3 illustrates various logic circuits that may be implemented in the CPU 150 of FIG. 1 to perform the processes described above.

MAL logic block 102 is described above with respect to FIG. 2, and it may be implemented using logic circuitry that is included within CPU 150 of FIG. 1. CPU subsystem 310 may also be implemented using logic circuitry that is included within CPU 150. CPU subsystem 310 includes AVS logic circuitry 106 (described above with respect to FIG. 2), Sdelta table 101 that is stored in memory of CPU subsystem 310, token manager logic circuitry 311 that is described in further detail below, and CPU clock controller 312. In an example embodiment, CPU clock controller 312 is circuitry that controls a clock, and it may be separate from or included within clock circuitry 160 of FIG. 1. DVFS process 107 of FIG. 2 may be implemented by one or more logic circuits of the CPU subsystem 310 executing computer-readable instructions.

PMIC arbiter 320 may be implemented in CPU 150 or in PMIC 170 of FIG. 1. PMIC arbiter 320 facilitates communication between CPU subsystem 310 and a PMIC. As explained in more detail below, MAL logic circuitry 102 and AVS logic circuitry 106 pass control signals to the PMIC (via PMIC arbiter 320) to affect the operating voltage or voltage margin in accordance with the per-core voltage adjustment and AVS functionality described above.

When the processor determines to add another active core, it sends a request to token manager 311. In response to the request, token manager 311 automatically reduces the clock frequency by sending a control signal to CPU clock controller 312. As noted above, in one example where the normal operating frequency is around 2 GHz, token manager 311 may automatically reduce the clock frequency by instructing CPU clock controller 312 to reduce the clock frequency by 100 MHz or so. As explained above, the amount of reduction of the clock frequency may be based upon known properties of the CPU, and the reduced clock frequency may be assumed to be a frequency at which normal operation may be ensured even if the PMIC provides its lowest programmed operating voltage. Thus, other embodiments may use a different value for frequency reduction.

After token manager 311 instructs CPU clock controller 312 to reduce the clock frequency, token manager 311 then sends a signal indicative of the new number of active cores to MAL logic block 102. During this time, the active cores are performing processing operations at the reduced frequency, and CPU subsystem 310 brings the additional cores to an active status. For instance, CPU subsystem 310 may perform clock gating operations to provide an oscillating clock signal to a core, thereby bringing the core to an active status. Therefore, when the additional cores become active, they do so at the lower frequency level.

MAL logic block 102 also receives a temperature reading from either another logic circuit or a temperature sensor (not shown). In response to receiving the indication of number of cores from token manager 311, MAL logic block 102 traverses table 101 that is stored in the memory of the CPU subsystem 310.

Figure 4:
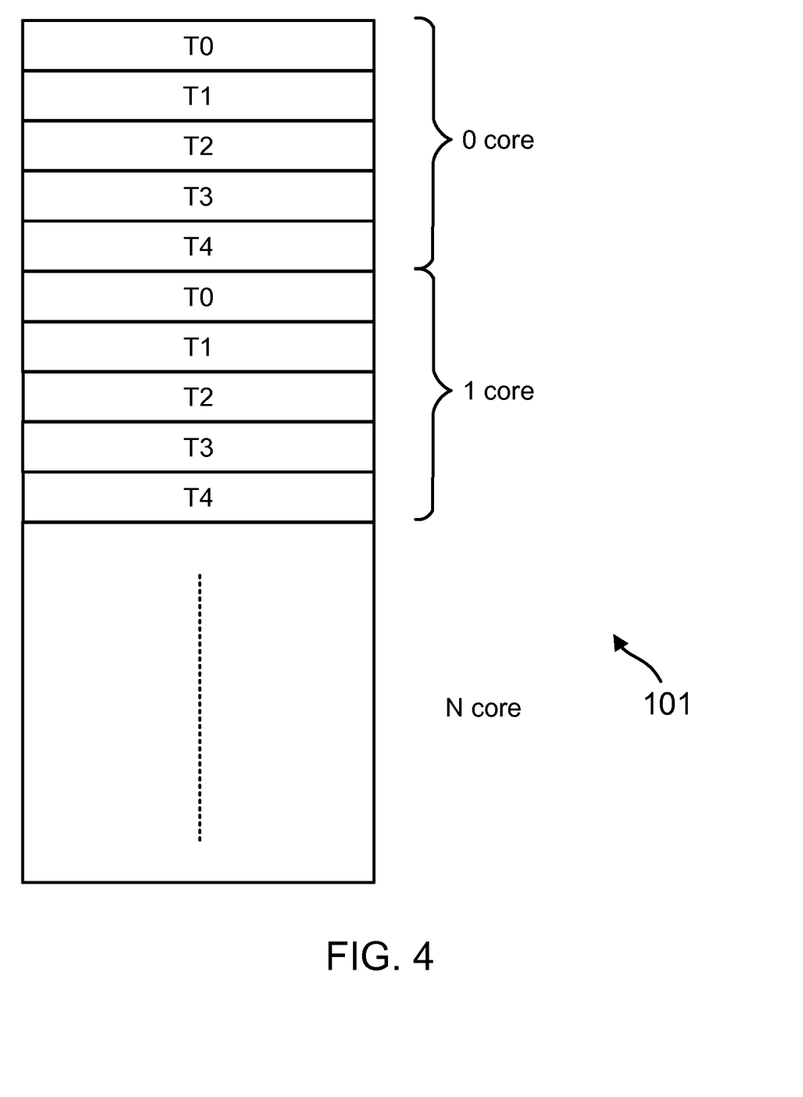
FIG. 4 is an illustration of an example table arranged by operating temperature and number of active cores, adapted according to one embodiment.

FIG. 4 is an illustration of an example table 101, adapted according to one embodiment. FIG. 4 shows an example implementation of Sdelta table 101 of FIGS. 2 and 3. Table 101 has multiple entries, where the entries are arranged by a temperature band and a number of cores. For instance, the top five entries in the table are associated with zero cores being active and five different temperature bands T0-T4. Example temperature bands may include five different bands between −50° C. and 150° C., although bands may be defined in any appropriate manner. Also, various embodiments may include any appropriate number of temperature bands in the table.

The next group of table entries includes five entries associated with one active core. The temperature bands are the same bands as discussed above. In an example where the CPU has four cores, table 101 may be scaled so that it includes a group of entries for zero cores, one core, two cores, three cores, and four cores. In the example of FIG. 4, table 101 is scaled to include N cores. N may be any appropriate number, such as four, eight, 16, or the like.

Each entry in this example table includes an indication of an amount of voltage steps, relative to a target voltage, that can be added to an operating voltage to achieve an appropriate voltage margin. Furthermore, frequency and voltage are generally related such that a higher operating frequency may generally be expected to benefit from a somewhat higher operating voltage because of the electrical behavioral properties of the physical conductors in semiconductors of the CPU. Therefore, an appropriate operating voltage for a frequency of 800 MHz may be different from an appropriate operating voltage for a frequency of 2 GHz. Accordingly, as the DVFS process changes to a different mode, it repopulates the table 101.

In one example, the electrical behavioral properties of the physical conductors are known beforehand from testing or design of the CPU and can be used to pre-calculate entries of the table for various DVFS modes. Continuing with the example, design or testing finds a minimum operating voltage for a maximum number of cores with a worst temperature operating condition. This may be defined as the target voltage. After that, the minimum voltage for a different number of cores for each of the different core permutations in different temperature bands is also determined from either design or testing. For each number of cores and temperature, the highest minimum voltage is chosen because some individual cores may require a somewhat higher voltage even though the number of cores is the same. Each entry in table 101 represents a difference between the target voltage and a highest minimum voltage for that number of cores and that temperature band, expressed in voltage steps.

Returning to FIG. 3, MAL logic block 102 has received an indication of a number of active cores from token manager 311 as well as a temperature reading. MAL logic block 102 then traverses the table 101 to select an entry associated with that number of cores at a temperature band corresponding to the temperature reading. MAL logic block 102 then compares that value from the table entry to a current setting, determines the difference between the two, and converts the difference into a voltage. MAL logic block 102 then passes that voltage indication to the PMIC arbiter 320 via CPU subsystem 310 and AVS logic 106. When PMIC arbiter 320 receives the voltage indication, it causes the PMIC to adjust the voltage accordingly, thereby adjusting the voltage margin. In this manner, MAL logic block 102 achieves an open-loop voltage margin adjustment in response to a number of active cores.

At this point, MAL logic block 102 sends an acknowledgment to token manager 311 that it has adjusted the voltage margin. Upon receiving the acknowledgment, token manager 311 instructs CPU clock controller 312 to adjust the operating frequency back to the prior operating frequency. For instance, if the operating frequency had been lowered by 100 MHz, token manager 311 would instruct CPU clock controller 312 to raise the operating frequency by 100 MHz to return to the prior operating frequency.

MAL logic block 102 also converts the voltage information into a number of ring oscillator ticks for use by AVS logic 106. For instance, AVS logic 106 may operate by observing various ring oscillators (not shown) distributed around the CPU. As noted above, voltage and frequency have a relationship that is determined by the electrical behavioral properties of the physical components of the CPU. The behavior of the ring oscillators is affected by process variation of the CPU, operating temperature, and voltage. Each ring oscillator provides an indication of device behavior at a given operating temperature and voltage. AVS logic 106 is preprogrammed to read a number of ticks from a ring oscillator, compare the reading to a target number of ticks for that frequency and temperature, and to adjust a voltage up or down to achieve the target number of ticks, thereby ensuring proper operation at a target frequency. AVS logic 106 in this example adjusts the voltage up or down by sending control signals to PMIC arbiter 320.

Continuing with the example, MAL logic block 102 provides a number of oscillator ticks to AVS logic block 106 to be added to a target number of ticks to accomplish the appropriate voltage margin. For example, if MAL logic block 102 determines to increase the operating voltage by 20 mV, MAL logic block 102 has functionality to translate the voltage difference (20 mV) into a number of ring oscillator ticks. Alternatively, MAL logic block 102 may include functionality to directly translate the difference in the table entry into a number of ring oscillator ticks, rather than translating to voltage first. In any event, MAL logic block 102 provides an indication of a number of ring oscillator ticks to AVS logic 106. AVS logic 106 then adds that number of ring oscillator ticks to its target number of ring oscillator ticks and continues to provide its closed-loop AVS functionality. Of course, some changes may include a reduction of voltage margin, in which case the voltage difference would be negative rather than positive, and the number of ring oscillator ticks may be decreased instead of increased.

In this manner, MAL logic block 102 provides an open-loop adjustment to voltage margin. It also provides information about that adjustment to the closed-loop AVS process provided by AVS logic 106, so that the system of FIG. 3 includes both open-loop and closed-loop adjustment.

Various embodiments provide one or more advantages over conventional systems. For instance, the examples described above provide an open-loop voltage margin adjustment in a relatively short span of time. MAL logic block 102 uses the entries in the table to achieve an appropriate voltage margin for a given number of cores at a given temperature, thereby avoiding using a higher voltage margin than is appropriate. Being able to use an appropriate voltage margin, rather than a worst case voltage margin, may provide for reduced power usage in some instances. Furthermore, instead of delaying activation of cores until a new voltage margin is achieved, the example system above reduces the operating frequency to a level that ensures proper operation of those active cores at a worst-case voltage. Therefore, the temporary frequency reduction during the change in number of active cores provides for faster activation of cores. Furthermore, the above system integrates a closed-loop AVS margin adjustment and an MAL open-loop margin adjustment without delaying operation of either MAL or AVS. Various embodiments may be implemented in computing devices, such as smart phones and tablets, to conserve energy.

Figure 5:
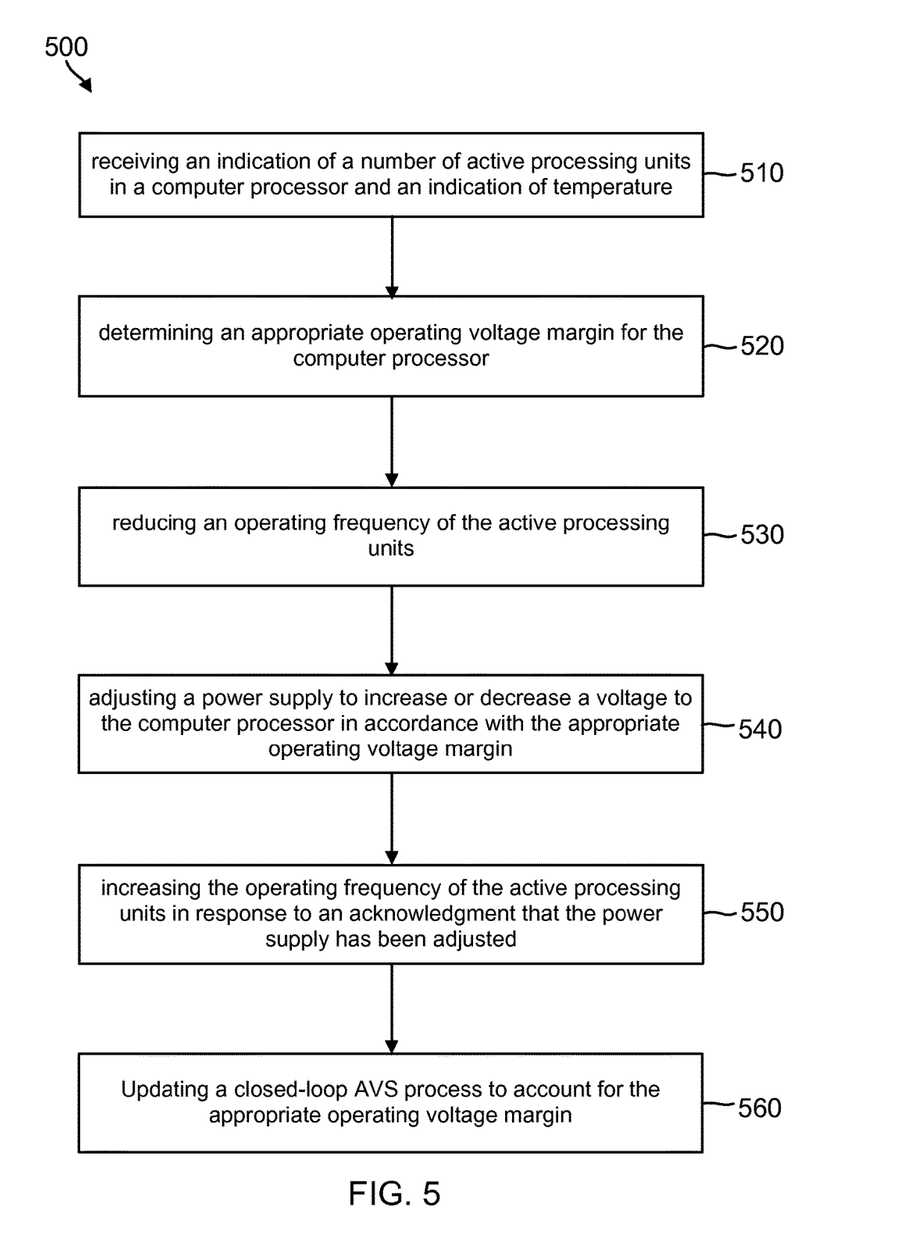
FIG. 5 is an illustration of a flow diagram of an example method of adjusting a voltage margin.

A flow diagram of an example method 500 of adjusting a voltage margin is illustrated in FIG. 5. In one example, method 500 is performed by logic in a computer processor (e.g., a CPU, GPU, or SOC), such as described above with respect to FIGS. 2 and 3. The logic may be either hardware logic or software logic or a combination thereof. In the case of software logic, the computer processor reads computer-executable code from a non-transitory medium such as cache or random access memory and executes the code to perform the actions of method 500.

At action 510, the processing logic receives an indication of a number of active processing units in a computer processor and an indication of temperature. In the example of FIG. 3, MAL logic block 102 receives an indication of an increase or a decrease in the number of active cores from the token manager 311. The indication may include any appropriate control signal that either explicitly indicates a number of active processing units or provides information from which the number of active processing units may be derived. Furthermore, in the example of FIG. 3, token manager 311 sends an indication of a number of active cores as part of a process to either activate or deactivate some cores. Also, the processing logic receives an indication of temperature, where the indication of temperature may be any appropriate indication, such as a core temperature reading.

At action 520, the processing logic determines an appropriate operating voltage margin for the computer processor. In one example, MAL logic 102 uses the indication of a number of active cores as well as a temperature reading to traverse a table of voltage steps. Continuing with the example of FIG. 3, the voltage steps in the table 101 do not explicitly indicate a voltage margin level, but rather provide information that the MAL logic 102 uses to determine and implement the voltage margin level. The scope of embodiments includes any technique to determine an appropriate operating voltage margin from the indication of active cores and indication of temperature.

At action 530, the processing logic reduces an operating frequency of the active processing units. Action 530 is performed in this example as part of the process to either activate or deactivate cores. The processing logic lowers the operating frequency temporarily during the process to activate or deactivate cores and returns the operating frequency to its normal or target value after the active cores are online and the voltage has been adjusted appropriately. An example is given above at FIG. 3, where token manager 311 instructs CPU clock controller 312 to lower the operating frequency in response to a request for new cores to be active. In some embodiments, the processing logic only reduces the frequency if it determines that the change in number of cores will result in an increase in voltage margin. If voltage margin is already above the appropriate value (for example when number of active cores is being reduced), there may be no advantage in lowering the frequency. Thus, the processing logic may skip action 530 for some changes in number of active cores, especially those changes that reduce a number of active cores.

At action 540, the processing logic adjusts a power supply to increase or decrease a voltage to the computer processor in accordance with the appropriate operating voltage margin. For instance, in the example of FIG. 3, MAL logic block 102 sends an instruction to PMIC arbiter 320 to either raise or lower the voltage, depending on the value it read from the table 101. As noted above, the voltage can either be raised or lowered, and generally a decrease in the number of active cores results in a lowering of the voltage whereas an increase in the number of cores results in an increase of the voltage. However, the scope of embodiments is not limited to any particular amount at which the voltage may be changed. Furthermore, some embodiments adjust the operating voltage so as to use enough voltage margin to accommodate voltage droops but also to avoid using a higher voltage level that exceeds an expected droop for a given number of cores.

At action 550, the processing logic increases the operating frequency of the active processing units in response to an acknowledgment that the power supply has been adjusted. In the example of FIG. 3, MAL logic block 102 sends an acknowledgment signal to token manager 311 after MAL logic unit 102 has adjusted the voltage. The acknowledgment signal triggers token manager 311 to return the operating frequency to its normal or target frequency. This process was discussed in more detail above with respect to action 530.

At action 560, the processing logic updates a closed-loop AVS process to account for the appropriate operating voltage margin. This process was discussed above in more detail with respect to FIG. 3, where MAL logic block 102 sends data to AVS logic block 106 to indicate the amount of change to the operating voltage, in this case as a number of ring oscillator ticks. The AVS process continues to continually adjust the voltage to accommodate operating frequency according to temperature and process variations, although it performs the adjustment on top of the added margin from the MAL logic block 102.

The scope of embodiments is not limited to the specific method shown in FIG. 5. Other embodiments may add, omit, rearrange, or modify one or more actions. For instance, method 500 may also accommodate other processes, such as a DVFS process, which adjusts a voltage and/or a frequency of operation according to a workload of the processor. As explained in the examples above, the DVFS process may be used to populate a table, such as table 101.

Furthermore, some embodiments may further include adjusting the voltage margin even in the absence of a change in the number of operating cores. Specifically, as shown in FIG. 3, MAL logic block 102 receives an indication of temperature. In such an example, MAL logic block 102 may check the temperature reading periodically or at other defined times. In a scenario where the temperature reading has changed significantly from a prior temperature reading (or in response to any other appropriate trigger) MAL logic block 102 then traverses table 101 to find an entry corresponding to the current number of active cores and current temperature reading. MAL logic block 102 then instructs PMIC arbiter 320 to adjust the voltage in accordance with the table reading, as described above with respect to FIG. 3. Also, MAL logic block 102 will then inform AVS logic block 106 of the voltage change, in some instances translating the change to a number of ring oscillator ticks. In fact, MAL logic block 102 may update AVS logic block 106 in a same or similar manner as described above with respect to FIG. 3. However, in the absence of a change in the number of active cores, the process skips the temporary frequency adjustment of actions 530 and 550.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for adjusting a voltage in a computer processor, the method comprising:
   receiving an indication of a number of active processing units in the computer processor, wherein the indication is associated with a change in the number of active processing units;
   in response to receiving the indication, determining an appropriate operating voltage margin for the computer processor based at least in part on the number of active processing units;
   reducing an operating frequency of the active processing units from a first frequency to a reduced frequency in response to receiving the indication;
   adjusting a power supply to increase or decrease the voltage to the computer processor in accordance with the appropriate operating voltage margin while the active processing units are operating at the reduced frequency; and
   increasing the operating frequency of the active processing units from the reduced frequency to the first frequency in response to an acknowledgment that the power supply has been adjusted, the method further comprising:
   increasing or decreasing a target number of ring oscillator clock ticks in accordance with adjusting the power supply; and
   performing a closed-loop operating voltage margin adjustment process based on an observed number of ring oscillator clock ticks compared to the target number of ring oscillator clock ticks.

2. The method of claim 1, wherein determining the appropriate operating voltage margin comprises:
   traversing a table having a plurality of entries, each of the entries corresponding to a respective value for a particular number of active processing units, an operating temperature, and an indication of voltage margin.

3. The method of claim 1, wherein determining the appropriate operating voltage margin comprises:
   determining a voltage value corresponding to a range of temperatures in which the computer processor is operating.

4. The method of claim 1, further comprising:
   receiving an indication of a change in operating temperature of the computer processor;
   in response to receiving the indication of the change in operating temperature, determining an adjustment to the appropriate operating voltage margin; and
   adjusting the power supply to implement the adjustment to the appropriate operating voltage margin.

5. The method of claim 1, wherein the method is performed by a hardware process of the computer processor.

6. The method of claim 1, wherein the method comprises an open-loop hardware process of the computer processor.

7. The method of claim 1, further comprising:
   adjusting the operating frequency of the computer processor in response to running a particular application on the computer processor; and
   in response to adjusting the operating frequency, populating a table having a plurality of entries, each of the entries corresponding to a respective value for a number of active processing units, an operating temperature, and an indication of voltage margin;
   wherein determining an appropriate operating voltage margin for the computer processor comprises traversing the table using the indication of the number of active processing units and an indication of operating temperature to identify a corresponding indication of voltage margin.

8. The method of claim 1, wherein adjusting the power supply is performed by a hardware process of the computer processor, the method further comprising:
   after acknowledgment that the power supply has been adjusted, returning control of voltage adjustment to an open-loop adaptive voltage scaling (AVS) process.

9. A system for adjusting an operating voltage margin, the system comprising:
   a computer processor having a plurality of processing cores;
   a temperature sensor configured to detect an operating temperature of the computer processor;
   a power supply configured to deliver an adjustable voltage to the computer processor;
   a first processing logic configured to receive information from the temperature sensor indicative of the operating temperature of the computer processor and to receive information indicative of a number of active processing cores;
   a second processing logic configured to reduce an operating frequency of the computer processor from a first frequency to a reduced frequency in response to a change in the number of active processing cores,
   wherein the first processing logic is further configured to control the power supply to provide the operating voltage margin corresponding to the operating temperature of the computer processor and the information indicative of the number of active processing cores while the active processing cores are operating at the reduced frequency, and
   wherein the second processing logic is further configured to increase the operating frequency of the computer processor from the reduced frequency to the first frequency after the first processing logic causes an adjustment of the operating voltage margin; and a third processing logic configured to increase or decrease a target number of ring oscillator clock ticks in accordance with the operating voltage margin and configured to perform a closed-loop operating voltage margin adjustment process based on an observed number of ring oscillator clock ticks compared to the target number of ring oscillator clock ticks.

10. The system of claim 9, wherein the computer processor comprises a central processing unit (CPU).

11. The system of claim 9, wherein the computer processor comprises a graphics processing unit (GPU), and wherein the processing cores comprise shaders.

12. The system of claim 9, wherein the computer processor is implemented as a system on chip (SOC), and wherein the power supply comprises a power management integrated circuit (PMIC) separate from and in communication with the SOC.

13. The system of claim 9, wherein the computer processor comprises the temperature sensor, the first processing logic, and the second processing logic.

14. The system of claim 9, wherein the second processing logic is further configured to receive a request to change a status of a first one of the plurality of processing cores to active, and in response to the request send the information indicative of the number of active processing cores to the first processing logic.

15. The system of claim 9, further comprising:
a fourth processing logic configured to change an operating voltage and the operating frequency of the computer processor in response to a change in workload of the computer processor, the fourth processing logic further configured to generate a table with a plurality of entries, each of the entries corresponding to a permutation of operating temperature and active core number.

16. The system of claim 15, wherein the first processing logic is further configured to select a value from the table by traversing the table according to the information indicative of the operating temperature and the information indicative of the number of active processing cores.

17. A method for adjusting a voltage in a computer processor, the method comprising:
in the computer processor having a plurality of processing cores, determining to change a status of a first one of the processing cores from inactive to active;
in response to determining to change the status, selecting an appropriate voltage margin for the computer processor corresponding to an increased number of active ones of the processing cores;
in response to determining to change the status, and before making the first core active, decreasing a frequency of operation of the computer processor from a first frequency to a reduced frequency;
making the first core active and applying the selected appropriate voltage margin while the computer processor is operating at the reduced frequency; and
increasing the frequency of operation of the computer processor from the reduced frequency to the first frequency after applying the selected appropriate voltage margin, the method further comprising:
increasing or decreasing a target number of ring oscillator clock ticks in accordance with applying the selected appropriate voltage margin; and
performing a closed-loop operating voltage margin adjustment process based on an observed number of ring oscillator clock ticks compared to the target number of ring oscillator clock ticks.

18. The method of claim 17, wherein selecting the appropriate voltage margin for the computer processor comprises:
traversing a table having a plurality of entries, each of the entries corresponding to a respective value for a number of active processing cores and an operating temperature.

19. The method of claim 17, wherein selecting the appropriate voltage margin comprises:
determining a voltage value corresponding to a range of temperatures in which the computer processor is operating.

20. The method of claim 17, further comprising:
receiving an indication of a change in operating temperature of the computer processor;
in response to receiving the indication of the change in operating temperature, determining an adjustment to the appropriate voltage margin; and
adjusting a power supply to implement the adjustment to the appropriate voltage margin.

21. The method of claim 17, wherein the method is performed by a hardware process of the computer processor.

22. The method of claim 17, wherein the method comprises an open-loop hardware process of the computer processor.

23. The method of claim 17, further comprising:
adjusting the frequency of operation of the computer processor in response to running a particular application on the computer processor; and
in response to adjusting the frequency of operation, populating a table having a plurality of entries, each of the entries corresponding to a respective value for a number of active processing units and an operating temperature;
wherein selecting the appropriate voltage margin for the computer processor comprises traversing the table using an indication of a number of active processing cores and an indication of operating temperature to identify a corresponding indication of voltage margin.

24. The method of claim 17, wherein applying the selected appropriate voltage margin is performed by a hardware process of the computer processor, the method further comprising:
after acknowledgment that the appropriate voltage margin has been applied, returning control of voltage adjustment to an open-loop adaptive voltage scaling (AVS) process.

25. A system for adjusting an operating voltage margin, the system comprising:
means for receiving an indication of a number of active processing units in a computer processor;
means for determining an appropriate level of the operating voltage margin for the computer processor in response to receiving the indication;
means for reducing an operating frequency of the active processing units from a first frequency to a reduced frequency in response to receiving the indication;
means for adjusting a power supply to increase or decrease a voltage to the computer processor in accordance with the appropriate level of the operating voltage margin while the active processing units are operating at the reduced frequency; and
means for increasing the operating frequency of the active processing units from the reduced frequency to the first frequency in response to an acknowledgment that the power supply has been adjusted, the system further comprising:

means for increasing or decreasing a target number of ring oscillator clock ticks in accordance with adjusting the power supply; and means for performing a closed-loop operating voltage margin adjustment process based on an observed number of ring oscillator clock ticks compared to the target number of ring oscillator clock ticks.

26. A computer program product having a non-transitory computer readable medium tangibly recording computer program logic for adjusting an operating voltage margin in a computer processor, the computer program logic which when executed by the computer processor causes the computer processor to perform the following actions:

receive an indication of a number of active processing units in the computer processor;

determine an appropriate level of operating voltage margin for the computer processor in response to receiving the indication;

reduce an operating frequency of the active processing units from a first frequency to a reduced frequency in response to receiving the indication;

adjust a power supply to increase or decrease a voltage to the computer processor in accordance with the appropriate level of operating voltage margin while the active processing units are operating at the reduced frequency;

increase the operating frequency of the active processing units from the reduced frequency to the first frequency in response to an acknowledgment that the power supply has been adjusted;

increase or decrease a target number of ring oscillator clock ticks in accordance with adjusting the power supply; and perform a closed-loop operating voltage margin adjustment process based on an observed number of ring oscillator clock ticks compared to the target number of ring oscillator clock ticks.

27. The method of claim 1, further comprising:

sending the acknowledgement from a first logic module that adjusts the power supply to a second logic module that increases the operating frequency.

* * * * *